United States Patent [19]

Pötsch

[11] Patent Number: 4,821,218

[45] Date of Patent: Apr. 11, 1989

[54] METHOD AND APPARATUS FOR DETERMINING AT LEAST ONE CHARACTERISTIC VALUE OF MOVEMENT OF A BODY

[76] Inventor: Edmund R. Pötsch, Augsburgerstrasse 41, D-8901 Königsbrunn, Fed. Rep. of Germany

[21] Appl. No.: 867,188

[22] PCT Filed: Sep. 4, 1985

[86] PCT No.: PCT/EP85/00446

§ 371 Date: May 5, 1986

§ 102(e) Date: May 5, 1986

[87] PCT Pub. No.: WO86/01607

PCT Pub. Date: Mar. 13, 1986

[30] Foreign Application Priority Data

Sep. 5, 1984 [DE] Fed. Rep. of Germany ....... 3432596

[51] Int. Cl.$^4$ ..................... G01P 15/08; G01C 22/00
[52] U.S. Cl. ..................... 364/566; 235/105; 377/24.2; 340/669; 340/689; 73/505; 73/509
[58] Field of Search ............. 364/560, 561, 565, 566; 73/503, 505, 507, 509–511, 517 R, 518; 235/105, 95; 324/162, 163; 340/689, 669–672; 272/70; 377/23, 24, 24.1, 24.2

[56] References Cited

U.S. PATENT DOCUMENTS

| 4,094,199 | 6/1978 | Holdren et al. | 364/566 |
| 4,460,823 | 7/1984 | Ruehlemann | 235/105 |
| 4,560,861 | 12/1985 | Kato et al. | 235/105 |
| 4,627,011 | 12/1986 | Spencer et al. | 364/566 |
| 4,741,001 | 4/1988 | Ma | 377/24.2 |

Primary Examiner—Parshotam S. Lall
Assistant Examiner—Brian M. Mattson
Attorney, Agent, or Firm—Armstrong, Nikaido Marmelstein & Kubovcik

[57] ABSTRACT

With the apparatus of the invention, any acceleration/deceleration in the direction of movement is sensed by a pendulum. Electrical signals derived therefrom are used for solving the differential equation of oscillation of the pendulum for determining the acceleration, velocity and/or the distance covered by the moved body within a desired time period.

19 Claims, 8 Drawing Sheets

SECTION A-B

SECTION C-D

METHOD AND APPARATUS FOR DETERMINING AT LEAST ONE CHARACTERISTIC VALUE OF MOVEMENT OF A BODY

1. Field of the Invention

The invention relates to a method and apparatus for determining the acceleration, the velocity and/or distance covered of a moved or moving body, for instance in respect to a running or jogging person. The apparatus, to the invention may also be used for determining a change of an angle of inclination of a sensor applied to a moved body, for instance, to an automobile.

2. State of the Art (a) Inertia navigation systems have become known which calculate the distance covered by integration of determined acceleration values. These systems use cardanly (freely movable) suspended platforms maintained stable by gyros in their position with respect to a horizontal plane. Pendulums may be used as acceleration transducers, as disclosed in the Germon Offenlegungsschrift No. 29 20 44 3. In particular, a pendulum provided with an inertia mass is maintained in its zero position by an electromagnetically generated torque. Exciting current necessary to generate this torque serves as a measure of the acceleration acting upon the inertia mass.

(b) Furthermore, so-called strap down navigation apparatus have become known which are provided with acceleration transducers secured to a moved body. The apparatus uses the determined acceleration values and displacement information of a gyro to compute, in combination with a co-ordinate transformation computer, the velocity and covered distance values.

(c) Also, acceleration sensors have become known operating according to the principle of linear displacement of an inertia mass and a coil provided with a resetting spring and arranged within a magnetic field (see German Offenlegungsschrift No. 23 03 104). The voltage induced in the coil upon the linear displacement is, after integration, a measure of the acceleration of the coil.

The inertia navigation systems mentioned under (a), as well as the navigation systems of (b), are of complex and expensive mechanical deisgn and require extensive and complex calculations, regulations and controls.

The apparatus explained under (c) is subject to relatively large friction forces in view of the mechanical guidance of the linearly moved inertia mass. It is, therefore, not adapted for measuring low non-periodic accelerations. Furthermore, such an apparatus is susceptible to considerable errors if the acceleration sensors are not secured to the moved body in an exactly horizontal manner.

SUMMARY OF THE INVENTION

It is an object of the present invention to provide a method and apparatus for measuring and determining the acceleration, the velocity and/or the distance covered in respect to a body moved essentially linearly and for directly displaying the determined values.

It is a further object of the invention to provide a method and apparatus which are particularly adapted for moving sportsmen and which determine and display acceleration, velocity and/or covered distance.

Still another object of the invention is to provide an apparatus for measurements having a high sensitivity at low acceleration.

Still another object of the present invention is to provide an apparatus having a compact, shock-insensitive design and low weight such that the complete apparatus is adapted to be attached to, and carried by, a sportsman without affecting his or her movement.

It is another object of the present invention to provide an apparatus having at least one vector of direction where any influence of a non-horizontal attachment to the body of the sportsman is compensated.

A still further object of the invention is a cost-effective implementation.

These and other objects of the invention are achieved by an apparatus for determining at least one characteristic value of movement (acceleration, velocity, distance covered) of a body comprising:

(a) a housing attachable to the body;

(b) a sensor device arranged in the housing and including a pendulum suspended for free deflection in a direction opposite to the direction of movement of the body;

(c) a transducer device associated with the sensor device for generating electrical signals in response to the deflection of the pendulum;

(d) a processing device for receiving the electrical signals and for solving the differential equation of oscillation of that pendulum on the basis of the electrical signals, and for calculating the at least one characteristic value of movement; and (e) a display device for displaying at least one characteristic value of movement calculated by the processing device.

With the apparatus according to the invention, there is eliminated the complex control circuit which is necessary with known acceleration transducers for generating the restoring torque. Only an integration of the determined values is necessary which may be carried out by a digital integration computer provided anyway.

An apparatus according to the invention is preferably intended for use in connection with a human or animal body. By attaching the apparatus to the body at a height corresponding to that of the center of gravity of the body, on the average, a stable vector of direction, with respect to the vertical axis through the center of gravity, is accomplished in view of the sense of equilibrium of the person or animal. This means that the person generates, by his sense of equilibrium, a reference direction which eliminates the complex arrangement using gyros and control networks.

The transducer or sensor of the apparatus according to the invention uses an inductance coil fixed to a pendulum and is pivotally mounted such that the inertia mass is capable of aligning in the direction of the vertical axis in the absence of any acceleration/deceleration. Thus, the direction of the vector of acceleration, being perpendicular to the vertical axis will always be predetermined, independent of the angle of attachment of the transducer to the body.

It should be noted that with no movement of the body, the transducer and sensor device are adapted to determine the angle of inclination by which the sensor is turned away from its rest position upon inclination of the body.

The inhomogeneous linear differential equation for the oscillation of the pendulum is known as:

$$(I)\ \ddot{\alpha} + 2\rho \cdot \dot{\alpha} + \omega_o^2 \alpha + \kappa_i \sin\alpha + = \kappa_2(a_x \cdot \cos\alpha - a_y \sin\alpha)$$

wherein:

α = angle of deflection
$\dot{\alpha}$ = first derivative of the angle of deflection
$\ddot{\alpha}$ = second derivative of the angle of deflection
$\rho_1\omega_1\kappa_{i1}\kappa_2\rho,\omega_o,\kappa_1,\kappa_2$ = constants of the physical design of the pendulum, and
$a_x, a_y$ = x- and y-components of acceleration determined by the physical design of the pendulum.

For small angles of α, the y-component may be neglected since cos α ~ 1 and sin α ~ 0.

This results in the simplified differential equation:

(II) $\ddot{\alpha} + 2\rho\dot{\alpha} + \omega_o^2 \alpha = \kappa_2 \cdot a_x$ From equation (II), the acceleration in the direction of movement $a_x$ may be calculated provided that $\dot{\alpha}$ and/or α is determined by appropriate sensor and transducer devices.

In view of its very low bearing friction, the transducer or sensor of the instant invention achieves a high sensitivity with very low errors even with small amounts of acceleration.

Since any movement as well as any changes in the angle of inclination may be recognized, the sensor system according to the invention, is excellently adapted for alarm systems, for instance, for automobiles. Furthermore, monitoring changes in the angle of inclination may be useful in connection with buildings, such as bridges, towers or the like.

By employing a moving coil system, which is commercially available and used in moving coil galvanometers, the manufacture of the apparatus, according to the invention, is extremely cost-effective. It is particularly easy to provide the known moving coil system with an inertia mass.

DESCRIPTION OF PREFERRED EMBODIMENTS OF THE INVENTION

The method and apparatus according to the invention will now be explained by way of example with reference to the drawings which show two embodiments of the present invention.

Figure 10:
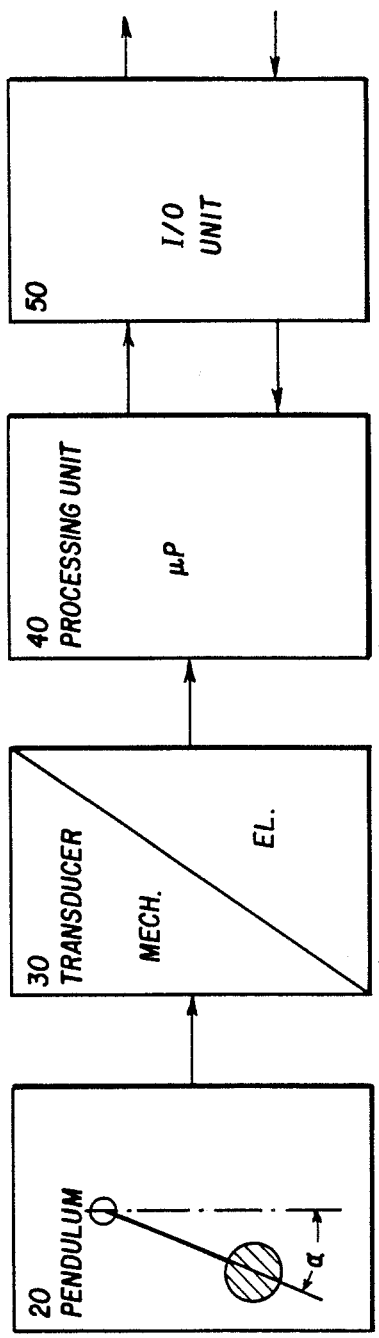
FIG. 10 is a schematic block diagram showing the main units of the apparatus according to the invention.

Referring first to FIG. 10, the apparatus, according to the invention, comprises a mechanical acceleration sensor unit 20 including a pendulum, a transducer unit 30 for converting a movement of the pendulum into electrical signals, a processing unit 40 such as a microprocessor, for instance of the type 80 51 of Intel Corporation, for receiving the electrical signals from the transducer 30 and processing the signals according to the differential equation of oscillation, and an input and display unit 50 for controlling the processing until 40 by actuating any of various keys and for displaying results and other values processed or stored in the processing unit.

Figure 1A:
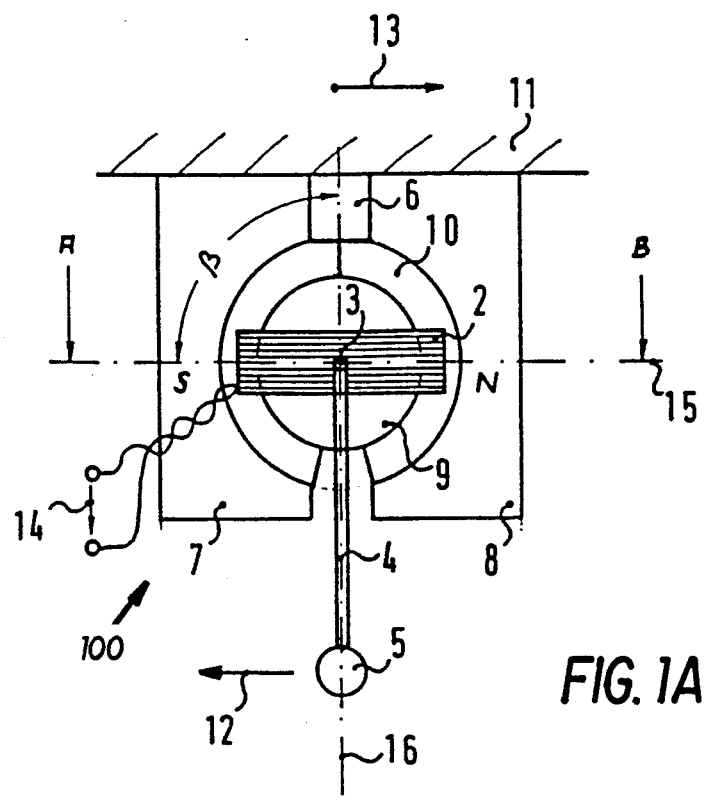
FIGS. 1a and 1b are a side view and a plane view of the sensor used with the apparatus according to the invention.
Figure 1B:
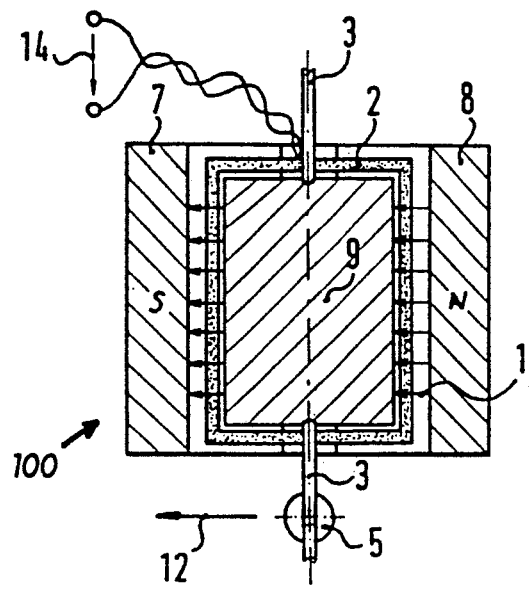

In implementing the principles of the present invention, in a preferred embodiment, the acceleration sensor unit and the transducer unit are combined to from a sensor and transducer unit 100 shown in FIGS. 1a and 1b.

It should be noted that all of the units illustrated in FIG. 10 are arranged in a housing 60 as will be described later in connection with FIGS. 9a to 9d. For simplicity, the housing is omitted in FIGS. 1a and 1b and FIGS. 5a and 5b and the various elements of the apparatus according to the invention are shown in a more schematic manner.

Figure 9A:
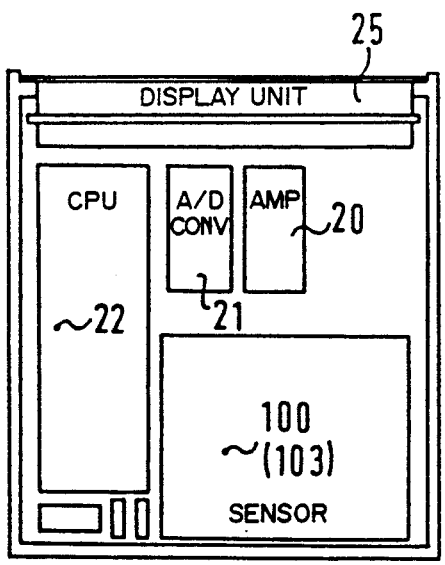
FIGS. 9a to 9d are views of the overall apparatus of the present invention.
Figure 9B:
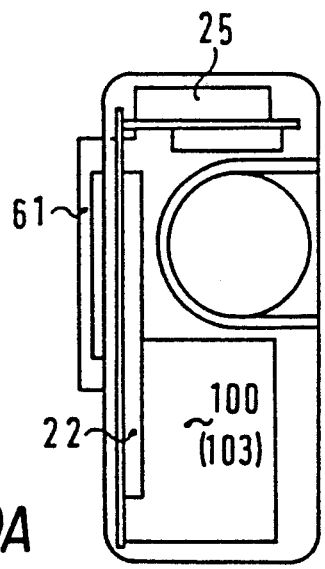
Figure 9C:
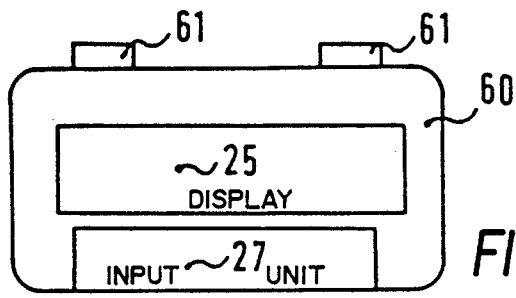
Figure 9D:
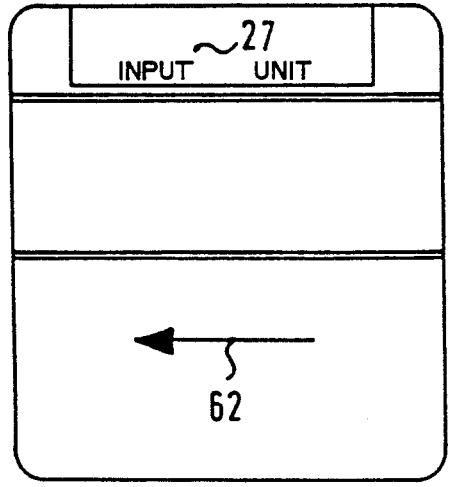

Referring now to FIGS. 1a and 1b, the sensor for sensing an acceleration of a moved body or a change of inclination includes a pendulum 4 provided with an inertia mass 5. The pendulum 4 is pivotally secured to a shaft 3 which extends horizontally within the housing 60 (FIG. 9c). The reference numeral 11 indicates a human body to which the apparatus, according to the invention, is attached. A permanent magnet 6 generates a magnetic field 1 between pole shoes 7 and 8 and armature 9 which has a cylindrical shape and has the shaft 3 as a central axis thereof. The armature 9 is fixed to the housing, as is the magnet 6. Between the inner circular surfaces of the pole shoes 7, 8 and the armature 9, an essentially circular air gap 10 is formed having a generally constant width. Thus there exists a homogeneous magnetic field 1 along most of the air gap 10.

An inductance coil 2 is rotatably mounted about the axis of shaft 3 and is secured to the pendulum 4 such that the coil 2 is moved within the magnetic field 1 existing in the air gap 10 whenever the pendulum 4 is deflected upon movement of the body.

The operation of the sensor and transducer unit 100 is as follows (FIGS. 3 and 4):

It is assumed that the apparatus according to the invention is fixed to the body of a jogger and that it is desired to determine the velocity and the distance covered by the jogger. As soon as the body 11 resumes movement, it is accelerated according to the direction vector 13. The same acceleration acts upon the inertia mass 5 in the direction of the direction vector 12 which is opposite to the vector 13. Thus, the pendulum 4 is deflected by an angle α from its rest position, indicated by a vertical axis 16, with reference to a clockwise direction in FIG. 1a. This results in a rotation of the inductance coil 2 by the angle α. When the coil 2 is rotating, the windings of coil 2 cut the field lines of the magnetic field 1 inducing a voltage 14 across its terminals. The relationship between the angle α and the induced voltage is:

$$u(t) \sim d\alpha/dt \quad \text{(III)}$$

Figure 3:
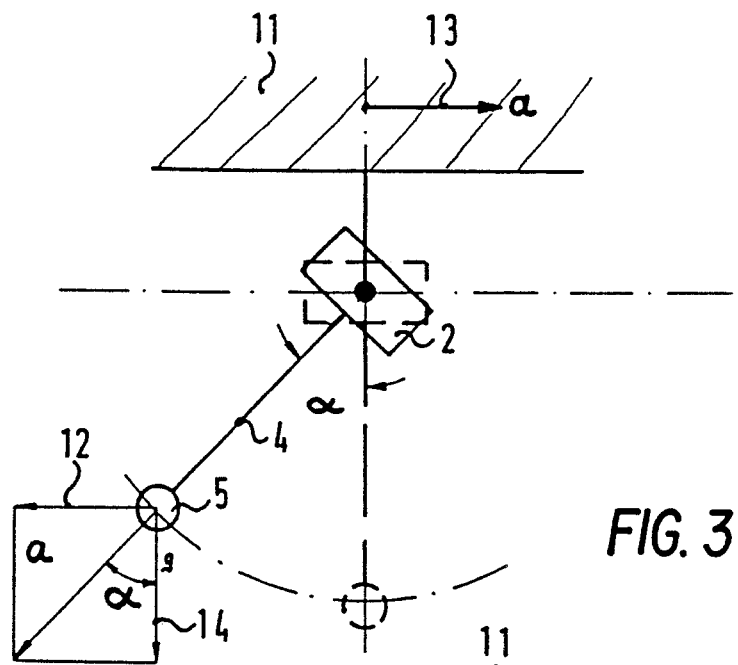
FIG. 3 is a schematic diagram showing the movement of a pendulum upon acceleration.

As may be gathered from FIG. 3, the angle α is related to the acceleration as follows:

$$\alpha = \arctan a/g \quad \text{(IV)}$$

where g is the acceleration of gravity. For small angles, α approximately is:

$$\alpha = a/g \quad \text{(V)}$$

For larger angle deflections, the increase of the angle α is smaller than the corresponding increase in acceleration a. This ensures a large overall measuring range with a high sensivity in the lower range. The deviation from linearity is determined by equation (IV). Such a deviation may be compensated by the processing unit 50 as will be described below. By a proper design of the air gap 10, the induced voltage 14 can be made highly linearly as follows:

In the lower range of the angle α, the air gap width may be larger and is reduced with increasing α in inverse proportion in accordance with equation (IV). The deviation of linearity is thus compensated by the magnetic induction increasing with increasing angle α.

Considering equations (III) and (V), the amount of the induced voltage 14 is in proportion to the change in acceleration a, i.e. in a change of the lengths of the direction vectors 12 and 13, respectively. Accordingly $$u(t) \sim d\dot{\alpha}/dt \sim da/dt \quad \text{(VI)}$$

Integrating the induced voltage 14 once, there results an acceleration a according to the acceleration vectors 12 and 13, respectively. This means that the acceleration a is in proportion to the pendulum deflection angle α.

In order to attenuate any initial transient oscillation of the pendulum 4, a dampening means may be provided. Such a dampening means may consist of a frame of electrically conductive material onto which the inductance coil 2 is wound. This frame attenuates the movement of the pendulum 4 due to the current induced in the frame upon movement of the pendulum.

Figure 6A:
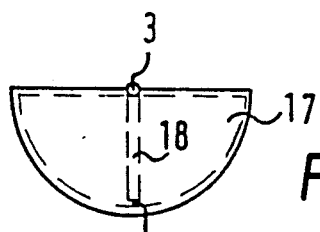
FIGS. 6a and 6b are a side view and a plane view of a dampening device used in connection with the apparatus according to the invention.
Figure 6B:
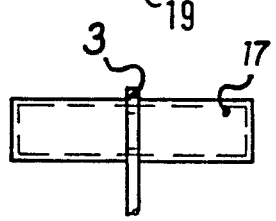

An alternative dampening means is shown in FIGS. 6a and 6b, and comprises a chamber 17 in which a plate 18 is moved upon deflection of the pendulum, by being fixed to the shaft 3. The attenuation is achieved by the pressure difference between the left and right portions (FIG. 6a) of the chamber 17 when the plate 18 is pivoted in a clockwise direction. This pressure difference is equalized slowly by a narrow gap 19 between the lower edge of the plate 18 and the inner surface of the chamber 17. The extent of attenuation may be determined by properly selecting the width of gap 19.

Figure 1C:
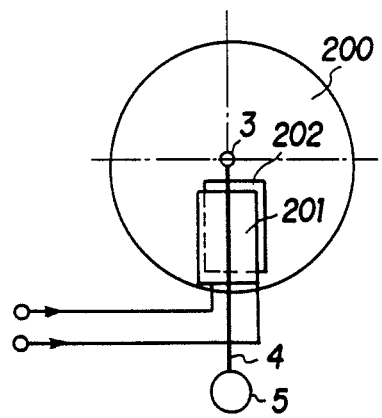
FIGS. 1c and 1d illustrate an optical/electrical transducer means.
Figure 1D:
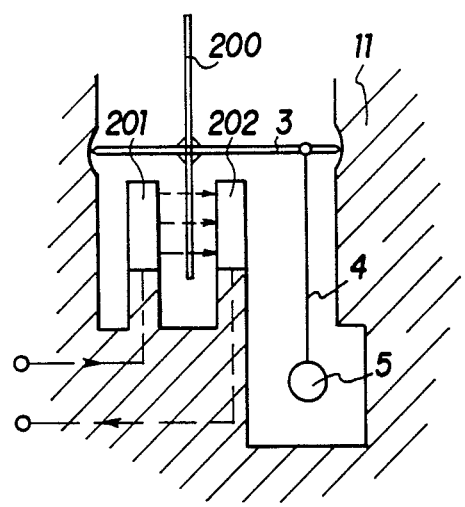

As indicated earlier, appropriate means are necessary to measure either the angle α of the deflection of the pendulum and/or its first derivative $\dot{\alpha}$. With the preferred embodiment, $\dot{\alpha}$ is measured by the voltage 14 induced in coil 2 by means of inductivity. Alternatively, α may be measured by a suitable optical/electrical transducer means operating on an analog or digital principal, such as coding discs 200 (FIGS. 1c and 1d) arranged between light emitting device 201 and light receiving device 202, CCD devices, clock pulse counting means or the like. Furthermore, α may be measured using inductively or capacitively operating bridge circuits, Hall-sensors or piezo resistive transducers (shown in FIG. 1e and explained below).

It should be noted that the computing of the acceleration a are simplified if both α and $\dot{\alpha}$ is measured.

Figure 2:
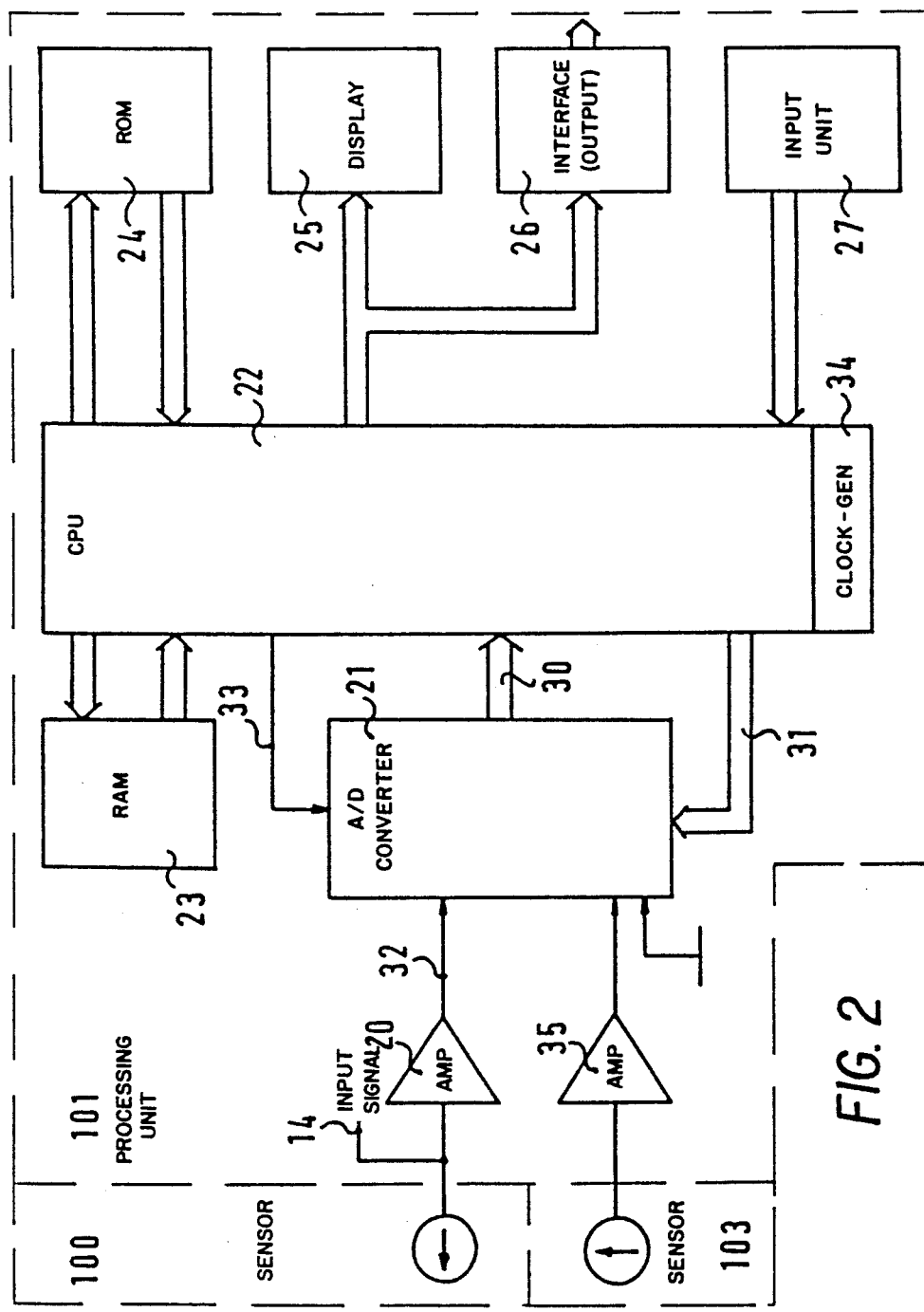
FIG. 2 shows a block diagram of the electronic portion of the apparatus of the present invention.

Referring to FIG. 2 the electronic section of the apparatus according to the invention will be described. The induced voltage 14 from the sensing and transducing unit 100 is applied to the processing and operating system 101. FIG. 2 shows a central processing unit CPU 22 in association with a RAM 23, a program memory 24, a display unit 25, an interface unit 26 and an input unit 27. The induced voltage 14 from the sensor and transducer unit 100 is applied to the CPU 22 through an A/D converter 21.

The input unit 27 may be provided with various keys for instructing the CPU 22 to perform various operational procedures. Any results and other desired values may be displayed by the display unit 25, or output for further evaluation via the interface 26.

The induced voltage 14 from the sensor and transducer unit 100 is applied as an analog signal 32 to the A/D converter 21 through an amplifier 20. The CPU 22 determines, by a signal transmitted through connection 13, which of the inputs of the A/D converter is to receive the input signals. The A/D converter 21 converts the analog input signal 32 to a digital value 30 which is received by the CPU 22 at defined intervals $\Delta t_i$ as instructed by the CPU 22 via control connection 33. At the beginning of a movement of the body, CPU stores a first value $\alpha_o$ in RAM 23. During the next scan cycle, a digital value corresponding to an angle increment $\Delta \alpha$ is received by the CPU 22 and a second digital value $\alpha_1$ is stored in RAM 23, and so on. By repeated additions at defined time intervals $\Delta t_i$, the integral of the induced voltage 14 is formed. The constant of integration is the result of the immediately preceding integration. Any result calculated at a certain time is the current acceleration of the moving body. If commanded by the input unit 27, such a result may be supplied to the display unit 26 and displayed there. Also, this result may be output through interface 26 for further evaluation.

As well-known to a person skilled in the art, the values for the velocity and the distance covered may be computed through further integrations according to the following formulae:

$$V_{i+1} = \int_0^i a_{(t)} \cdot dt + V_i \quad \text{(VII)}$$

$$S_{i+1} = \int_0^i v_{(t)} \cdot dt + S_i$$

$$i = u \cdot \Delta t$$
$$u = 0, 1 \ldots$$

wherein
$V_i =$ is the velocity at a time $t_i$, and
$S_i =$ is the distance covered at a time $t_i$ The computing will be effected in a well-known manner by a control program stored in, program memory 24. A clock signal, as well as the timing signals for determining the time $\Delta t_i$, will be generated by a clock generator 34.

Figure 4:
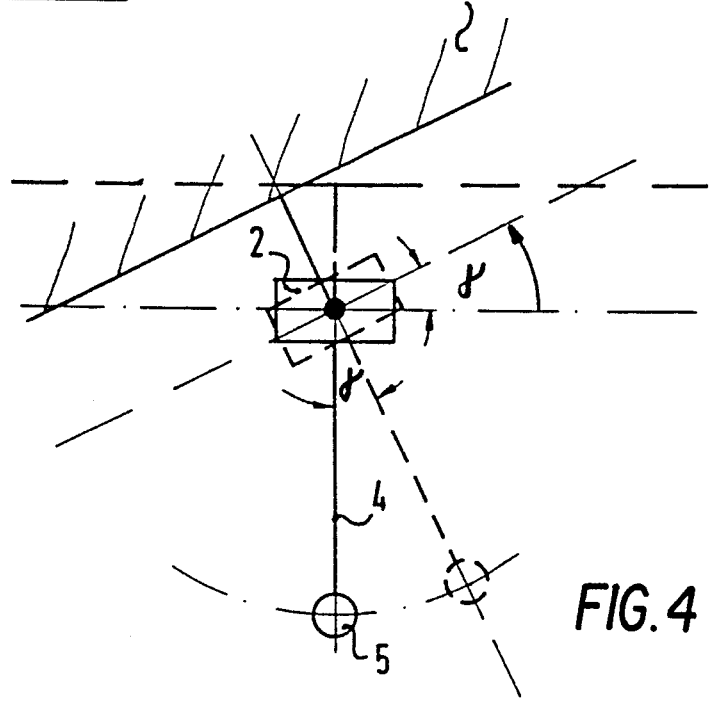
FIG. 4 is a schematic diagram for explaining the use of the apparatus according to the invention for indicating a change of inclination of a body having an apparatus fixed thereto.

Alternatively, as mentioned before, an apparatus according to the invention may be used for determining a change in an inclination angle γ if a body is turned from a first position into a different position. This situation is illustrated in FIG. 4. The integral of the induced voltage 14 is, according to equation (III), proportional to the angle γ of rotation and the first integral results in the inclination γ. Such a device may be used as an alarm device when attached to an automobile. In operation, any change of in the position of the car, for instance by lifting it at the front or the rear or by pushing or pulling it, will result in a deflection of the pendulum, a generation of an induced voltage 14, and an output signal 10 which may be used for actuating an alarm means.

As shown in FIG. 2, further sensing and transducing units 103 having direction vectors arranged at predetermined angles to direction vector 13 may be used. For each further sensing and transducing unit 103, there is provided an amplifier 35, the analog output signal of which is applied to the A/D-converter through inputs programmable by the CPU 22 through connection 31. By means of the input unit 27, the CPU 22 may be controlled such that the signals from all sensing and transducing units may be stored in RAM 23 and displayed by unit 25.

Figure 1E:
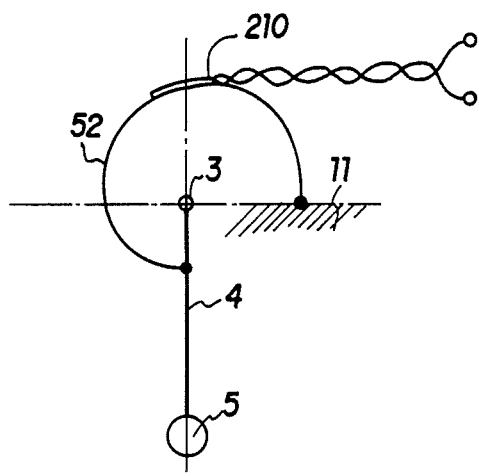
FIG. 1e illustrates a force measuring element.
Figure 5A:
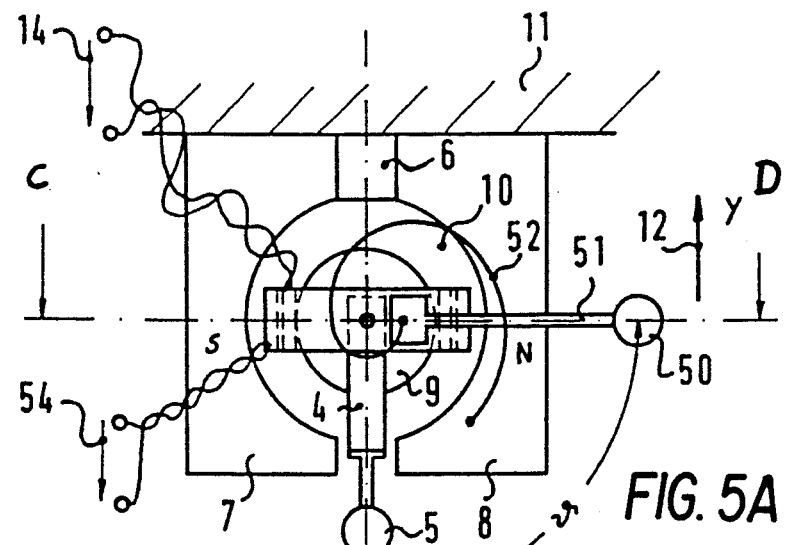
FIGS. 5a and 5b are a side view and a plane view similar to those of FIGS. 1a and 1b of another embodiment of the apparatus of the invention.
Figure 5B:
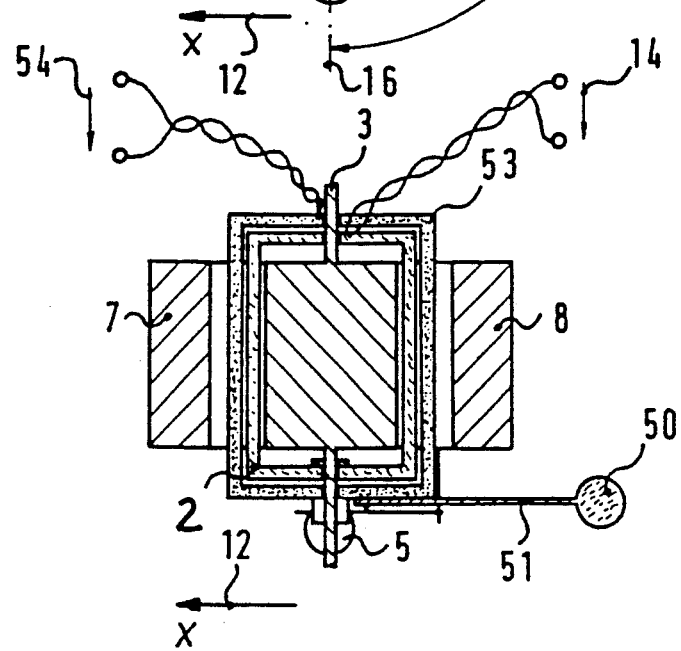

FIG. 5 shows a further embodiment of the apparatus according to the invention using two sensing and transducing units 100 and 103 combined with each other. There is only one magnetic circuit, as explained in connection with FIGS. 1a and 1b, producing a magnetic field 10 in which there are provided an inductance coil 2 and a rotatable coil 53 about the common shaft 3. Inductance coil 2 is secured to the pendulum 4 bearing the inertia mass 50. The pendulum 51 is maintained in a predetermined position by a spring 52, at a predetermined angle θ to the rest position 16 of the pendulum 4, as long as there is no acceleration Y acting on the pendulum 51. Any accelerations of the pendulums 4 and 51 result in induced voltages 14 and 54 as explained in connection with the first embodiment. As shown in FIG. 1e, as force measuring element 210, such as a piezo-resistance transducer, may be applied to the spring 52 shown in FIG. 5a.

Figure 7:
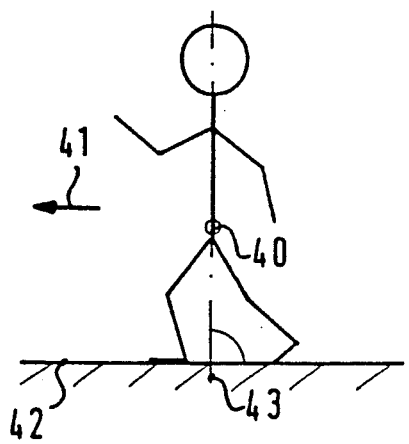
FIG. 7 is a schematic diagram for illustrating the position of the center of gravity of a human body.
Figure 8:
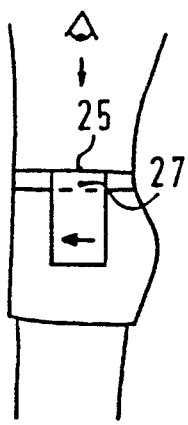
FIG. 8 is a schematic diagram illustrating how the apparatus according to the invention is attached to a human body.

FIGS. 7 and 8 illustrate how the apparatus according to the invention is attached to the body of a jogger. Typically the apparatus is attached at a height corresponding to the position of the center of gravity 40 of the body. In view of the sense of equilibrium of the jogger on the average a reference direction 41 is established parallel to the ground surface 42. Accordingly, axis 43 in the direction of the pendulum 4 in rest position.

FIGS. 9a to 9d shows the physical arrangement of the various units in the housing 60. Preferably, attaching means 61 may be used to attach housing 60 to the body of the jogger at the height of the center of gravity, for instance by a belt or a clip. Alternatively, the apparatus may be unitary with a piece of cloth. The arrow 62 shows the direction of movement and acceleration.

I claim:

1. An apparatus for determining at least one characteristic value of movement (acceleration, velocity, distance covered) of a moving body comprising:
   (a) a housing detachably mounted on said moving body independent of a vertical direction of attachment to said moving body;
   (b) a sensor means arranged in said housing and including a pendulum suspended in said housing for free deflection about a horizontal axis in a direction opposite to a direction of movement of said moving body;
   (c) a transducer means connected with said sensor means for generating electrical signals in response to any said deflection of said pendulum;
   (d) a processing means for continuously receiving said electrical signals, for continuously solving a differential equation of oscillation of said pendulum based on said electrical signals and for continuously calculating said at least one characteristic value of movement; and
   (e) a display means for displaying said at least one characteristic value of movement calculated by said processing means.

2. The apparatus of claim 1, wherein said transducer means includes an inductance means secured to said pendulum for rotation in a magnetic field upon any deflection of said pendulum for inducing a voltage, said magnetic field being generated in an air gap in which said inductance means is moveable and which is formed by a magnetic means circularly arranged about an axis of rotation of said inductance means, said induced voltage representing said deflection of said pendulum.

3. The apparatus of claim 2, wherein said pendulum is biased by a restoring spring means for returning said pendulum into a position in which said pendulum is maintained at a defined angle to a vertical axis in the absence of any acceleration/deceleration of said body.

4. The apparatus of claim 1 or 2, further comprising at least one further sensor means arranged to sense a movement in a direction different from that of said sensor means and arranged at a predetermined angle with respect thereto.

5. The apparatus of claim 4, wherein said at least one further sensor means comprises a further pendulum provided with a further inductance means for rotation with said further pendulum upon a deflection thereof and biased to a rest position at a predetermined angle with respect to the rest position of said pendulum by a spring means in an absence of any acceleration/deceleration acting upon said further pendulum.

6. The apparatus of claim 2, wherein said pendulum is provided with a dampening means.

7. The apparatus of claim 2 wherein said air gap has a varying width which is reduced in a direction of increasing deflection of said pendulum.

8. The apparatus of claim 1, wherein said processing means comprises:
   a microprocessor connected to said transducer means for receiving said electrical signals, a program memory connected to said microprocessor for storing a program for solving said differential equation of oscillation, a clock generator connected to said microprocessor for generating a system clock and time reference signals, a RAM means connected to said microprocessor for storing digital values derived from said electrical signals received from said transducing means and processed in said microprocessor, intermediate results and said at least one characteristic value calculated by said microprocessor, and input means connected to said microprocessor for conditioning said microprocessor to execute portions of said program stored in said program memory.

9. The apparatus of claim 8, wherein said processing means further comprises an output means for outputting data stored in said RAM means for further processing thereof.

10. The apparatus of claim 1, wherein said housing has arranged at its top surface said display means for displaying said at least one characteristic value of movement and selecting means for setting said processing means to calculate one of said characteristic values of movement.

11. The apparatus of claim 1, wherein said transducer means are optical/electrical transducing means.

12. The apparatus of claim 1, wherein said transducing means are force responsive means.

13. The apparatus of claim 1, wherein said transducer means generate electrical signals in dependence on an angle $\alpha$ of any deflection of said pendulum.

14. An apparatus for determining a change of angle of inclination of a moved body, comprising:
- a housing attached to said body independent of a vertical direction of attachment;
- a sensor means arranged in said housing and inlcuding a pendulum suspended in said housing for free deflection at least in one direction about a horizontal axis;
- a transducer means for generating electrical signals in response to any deflection of said pendulum; and
- a processing means for receiving said electrical signals and for solving a differential equation of oscillation of said pendulum based on said electrical signals and for calculating said change of angle of inclination of said moved body.

15. The apparatus of claim 14, wherein said processing means generates an output signal whenever said change in angle of inclination exceeds a predetermined value.

16. The apparatus of claim 14, wherein said procesisng means generates an output signal indicative of an amount of change of said angle of inclination.

17. The apparatus of claim 14, wherein said transducer means are optical/electrical transducing means.

18. The apparatus of claim 14, wherein said transducing means are force responsive means.

19. A method for determining at least one characteristic value of movement (acceleration, velocity and distance covered) of a body comprising the steps of:
(a) sensing from a beginning of the movement a deflection about a horizontal axis pendulum secured to said body independent of a vertical direction of attachment;
(b) generating electrical signals in resposne to any deflection of the pendulum;
(c) continuously solving a differential equation of oscillation of said pendulum based on said electrical signals;
(d) calculating said at least one characteristic value of movement based on a solution of said differential equation of oscillation of said pendulum; and
(e) selectively outputting said at least one characteristic value of movement.

* * * * *